(12) United States Patent
Krebs

(10) Patent No.: US 12,160,841 B2
(45) Date of Patent: Dec. 3, 2024

(54) METHODS, COMPUTER PROGRAMS AND WIRELESS COMMUNICATION DEVICES FOR DETERMINING A PROPAGATION TIME OF WIRELESS TRANSMISSIONS BETWEEN WIRELESS COMMUNICATION DEVICES

(71) Applicant: Bayerische Motoren Werke Aktiengesellschaft, Munich (DE)

(72) Inventor: Alexander Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 356 days.

(21) Appl. No.: 17/766,077

(22) PCT Filed: Jun. 4, 2020

(86) PCT No.: PCT/EP2020/065531
§ 371 (c)(1),
(2) Date: Apr. 1, 2022

(87) PCT Pub. No.: WO2021/063549
PCT Pub. Date: Apr. 8, 2021

(65) Prior Publication Data
US 2022/0361130 A1 Nov. 10, 2022

(30) Foreign Application Priority Data
Oct. 2, 2019 (EP) ..................................... 19201145

(51) Int. Cl.
*H04W 56/00* (2009.01)
*G01S 13/08* (2006.01)

(52) U.S. Cl.
CPC ......... *H04W 56/0065* (2013.01); *G01S 13/08* (2013.01)

(58) Field of Classification Search
CPC ................................................. H04W 56/0065
See application file for complete search history.

(56) References Cited

U.S. PATENT DOCUMENTS

| 2006/0056375 A1* | 3/2006 | Koyama | H04B 1/7172 370/320 |
| 2008/0231498 A1* | 9/2008 | Menzer | G01S 13/765 342/134 |
| 2021/0142602 A1* | 5/2021 | Bartlett | G07C 9/00309 |

FOREIGN PATENT DOCUMENTS

| EP | 1 701 564 A1 | 9/2006 |
| WO | WO 03/077432 A2 | 9/2003 |

OTHER PUBLICATIONS

European Communication purusant to Article 94(3) EPC issued in European Application No. 19 201 145.0 dated Apr. 21, 2022 (four (4) pages).

(Continued)

*Primary Examiner* — Brenda H Pham
(74) *Attorney, Agent, or Firm* — Crowell & Moring LLP

(57) ABSTRACT

Methods and devices related to determining a propagation time of wireless transmissions between wireless communication devices are provided. A propagation time of wireless transmissions between a first wireless communication device and a second wireless communication device is determined. The determining is based on a roundtrip time of a wireless transmission exchange between the first wireless communication device and the second wireless communication device, a reply time of the wireless transmission exchange, and on the first time interval and the second time interval. The first time interval is a time interval between a first transmit event at the first wireless communication device and a second transmit event at the first wireless communication device. The second time interval is a time interval between a first receive event at the second wireless communication device and a second receive event at the second wireless communication device.

11 Claims, 4 Drawing Sheets

(56) References Cited

OTHER PUBLICATIONS

International Search Report (PCT/ISA/210) issued in PCT Application No. PCT/EP2020/065531 dated Jul. 16, 2020 (two (2) pages).
European Written Opinion (PCT/ISA/237) issued in PCT Application No. PCT/EP2020/065531 dated Jul. 16, 2020 (six (6) pages).
Extended European Search Report issued in European Application No. 19201145.0 dated Mar. 12, 2020 (eight (8) pages).

\* cited by examiner

METHODS, COMPUTER PROGRAMS AND WIRELESS COMMUNICATION DEVICES FOR DETERMINING A PROPAGATION TIME OF WIRELESS TRANSMISSIONS BETWEEN WIRELESS COMMUNICATION DEVICES

BACKGROUND AND SUMMARY OF THE INVENTION

A proximity between a wireless transmitter and a vehicle can be used to enable vehicle access without confirming key presses on a hand-held wireless transmitter. In some systems, the distance between the vehicle and the handheld wireless transmitter is estimated by correlating the transmitted signal power to received signal power. In some cases, procedures based on this principle may be circumvented by a procedure known as "relay attack". Another approach is the measurement of a "propagation time", which may be a cryptographically secure method for estimating the spatial distance between the vehicle and the hand-held wireless transmitter. The propagation time of a signal is defined as the time interval between a transmission time and a reception time, from vehicle to hand-held wireless transmitter or, alternatively and equivalently, from hand-held wireless transmitter to vehicle. The measurement of the reception time can be cryptographically secured, e.g., by using a scrambled Timestamp Sequence (STS). The introduction of an STS based time measurement method is a subject of an extension of the IEEE 802.15.4-2015 wireless standard. In the extension of the standard, the approaches known as "Single-Sided Two-Way-Ranging" (SS-TWR) and "Double-Sided Two-Way-Ranging" (DS-TWR) are discussed. Both approaches have drawbacks. For example, in SS-TWR, the time measurement between the two devices may be slightly different, due to variations in the accuracy of the respective quartz oscillators, e.g., at different temperatures. In DS-TWR, concepts are employed that attempt to mitigate such variations. Still, some variations might not be mitigated, as a precise measurement of a point in time at which a wireless transmission is deemed received is complex, e.g., due to noise or multipath propagation.

There may be a desire for an improved concept for determining a propagation time of wireless transmissions between two wireless communication devices.

Embodiments of the present disclosure are based on the insight, that at least a part of the inaccuracies in the determination of the propagation time result from using time measurements that are based on a combination of two different categories of events for the mitigation of the oscillation quartz tolerances, namely two TX-RX (Transmit-Receive) time measurements and two RX-TX (Receive-Transmit) time measurements. For technical reasons, the measurement of receive events may be considered more complex and subject to higher measurement tolerances than, for example, the Determination of a TX-TX time difference or an RX-RX time difference. A measurement based on TX-RX and RX-TX pairs may therefore have performance disadvantages for the maximal achievable accuracy of the propagation time measurement. Furthermore, the DS-TWR requires an additional information exchange between the devices in comparison to SS-TWR in order to be able to carry out crystal oscillation compensation: If, for example, the formula for runtime measurement is to be calculated on the side of a first wireless communication device, the second wireless communication device may have to transmit a numerical value of a second roundtrip time measurement to the first wireless communication device after completion of the DS-TWR measurement. This represents an additional communication effort compared to the SS-TWR, since an additional numerical value is transmitted. The transmission of the additional numerical value has performance disadvantages if the communication channel between the devices has a limited capacity, which is usually the case in practical applications.

In order to improve the above procedures, in embodiments, a compensation approach that can be performed based on a TX-TX time difference (a first time interval) and an RX-RX time difference (a second time interval) is used. Embodiments of the present disclosure provide a method for determining a propagation time of wireless transmissions between a first wireless communication device and a second wireless communication device. The method comprises determining the propagation time based on a roundtrip time of a wireless transmission exchange between the first wireless communication device and the second wireless communication device, based on a reply time of the wireless transmission exchange, and based on the first time interval and the second time interval. The first time interval is a time interval between a first transmit event at the first wireless communication device and a second transmit event at the first wireless communication device. The second time interval is a time interval between a first receive event at the second wireless communication device and a second receive event at the second wireless communication device.

The first and the second time interval may be used to at least partially mitigate the variations between the time measurements of the two wireless communication devices. By defining the two time intervals between two corresponding events, i.e. two transmit events and two receive events, respectively, the inaccuracies that occur due to the measurement of the receive events may be reduced, as only one of the time intervals is based on receive events, and as it is likely that both receive events occur under similar conditions, resulting in a consistently measured second time interval.

For example, the first time interval and the second time interval may be used to mitigate an influence of a difference in time measurement between the first wireless communication device and the second wireless communication device. This may enable a more precise determination of the propagation time.

In some embodiments, the propagation time may be determined based on a ratio between the second time interval and the first time interval. In this case, the propagation time may be used as a compensation factor in a formula that is used to determine the propagation time.

For example, the propagation time may be determined using the formula $$T_{prop} = \frac{1}{2}\left(\frac{T_2}{T_1}T_{round} - T_{reply}\right)$$

wherein $T_{prop}$ is the propagation time, $T_1$ is the first time interval, $T_2$ is the second time interval, $T_{round}$ is the roundtrip time and $T_{reply}$ is the reply time. This may provide a determination of the propagation time with an improved accuracy.

Alternatively, the propagation time may be determined using the formula $$T_{prop} = \frac{(T_{round} \cdot (T_2 - T_{reply}) - T_{reply} \cdot (T_1 - T_{round}))}{(T_1 + T_2)}$$

wherein $T_{prop}$ is the propagation time, $T_1$ is the first time interval, $T_2$ is the second time interval, $T_{round}$ is the roundtrip time and $T_{reply}$ is the reply time. This may provide an alternate determination of the propagation time with an improved accuracy.

In some embodiments, the propagation time is determined repeatedly. For each determination of the propagation time, the second time interval may be measured anew. The second time interval may be averaged over at least two measurements. This may further reduce inaccuracies that occur due to the determination of the receive events.

In at least some embodiments, the method is performed by the second wireless communication device. In this case, no additional communication between the wireless communication devices might be required.

For example, the first time interval may be a pre-defined time interval. In this case, the first time interval may be used as a trigger for the second transmit event at the first wireless communication device. Alternatively, information on the first time interval may be received by the second wireless communication device from the first wireless communication device. For example, the second wireless transmission from the first wireless communication device to the second wireless communication device may be used to transmit the information on the first time interval to the second wireless communication device.

In some embodiments, one of the first and the second wireless communication device is a wireless communication device of a vehicle key. The other of the first and the second wireless communication device may be a wireless communication device of a vehicle. For example, embodiments may be used for keyless access systems between the vehicle key and the vehicle.

For example, the first wireless communication device and the second wireless communication device may communicate using Ultra Wide-Band (UWB) communication. UWB may be used, for example, between the vehicle key and the vehicle.

In at least some embodiments, the roundtrip time is a time interval between a transmit event at the first wireless communication device and a subsequent receive event at the first wireless communication device. For example, the reply time may be a time interval between a receive event at the second wireless communication device and a subsequent transmit event at the second wireless communication device.

Embodiments of the present disclosure further provide a computer program having a program code for performing the method, when the computer program is executed on a computer, a processor, or a programmable hardware component.

Embodiments of the present disclosure further provide a wireless communication device (e.g., the second wireless communication device). The wireless communication device comprises a transceiver module for wirelessly communicating with a first wireless communication device. The wireless communication device further comprises a processing module. The processing module is configured to determine the propagation time based on a roundtrip time of a wireless transmission exchange between the first wireless communication device and the second wireless communication device, based on a reply time of the wireless transmission exchange, and based on the first time interval and the second time interval. The first time interval is a time interval between a first transmit event at the first wireless communication device and a second transmit event at the first wireless communication device. The second time interval is a time interval between a first receive event at the second wireless communication device and a second receive event at the second wireless communication device.

Embodiments of the present disclosure further provide a first wireless communication device. The first wireless communication device comprises a transceiver module for wirelessly communicating with a second wireless communication device. The first wireless communication device comprises a processing module, configured to transmit a first wireless transmission to a second wireless communication device via the transceiver module, thereby generating a first transmit event. The processing module is configured to receive a response to the first wireless transmission from the second wireless communication device via the transceiver module. The processing module is configured to determine a roundtrip time. The roundtrip time denotes a time interval between the transmission of the first wireless transmission and the reception of the response to the first wireless transmission. The processing module is configured to transmit a second wireless transmission to the second wireless communication device, thereby generating a second transmit event. The processing module is configured to transmit information on the roundtrip time to the second wireless communication device. A time interval between the first transmit event and the second transmit event is denoted a first time interval. In one alternative, the second wireless transmission comprises information on the first time interval, the first-time interval being determined by the first wireless communication device based on the first transmit event and the second transmit event. In a second alternative, the first time interval is a pre-defined time interval triggering the transmission of the second wireless transmission. In a third alternative, the processing module is configured to transmit the information on the first time interval as part of an additional wireless transmission to the second wireless communication device.

Embodiments of the present disclosure further provide a second wireless communication device. The second wireless communication device comprises a transceiver module for wirelessly communicating with a first wireless communication device. The second wireless communication device comprises a processing module, configured to receive a first wireless transmission from the first wireless communication device via the transceiver module, thereby generating a first receive event. The processing module is configured to transmit a response to the first wireless transmission to the first wireless communication device via the transceiver module. The processing module is configured to determine a reply time. The reply time denotes a time interval between the reception of the first wireless transmission and the transmission of the response to the first wireless transmission. The processing module is configured to receive a second wireless transmission from the first wireless communication device via the transceiver module, thereby generating a second receive event. The processing module is configured to receive information on a roundtrip time from the first wireless communication device via the transceiver module. The processing module is configured to determine a second time interval between the first receive event and the second receive event. The processing module is configured to determine the propagation time based on the roundtrip time, based on the reply time, and based on a first time interval and the second time interval. The first time interval denotes a time interval between a first transmit event at the first wireless communication device and a second transmit event at the first wireless communication device. The first transmit event is generated by a transmission of the first wireless transmission by the first wireless communication device. The second transmit event is generated by a transmission of the second wireless transmission by the first wireless communication device.

BRIEF DESCRIPTION OF THE DRAWINGS

Some examples of apparatuses and/or methods will be described in the following by way of example only, and with reference to the accompanying figures, in which.

DETAILED DESCRIPTION OF THE DRAWINGS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

Unless otherwise defined, all terms (including technical and scientific terms) are used herein in their ordinary meaning of the art to which the examples belong.

Figure 1:
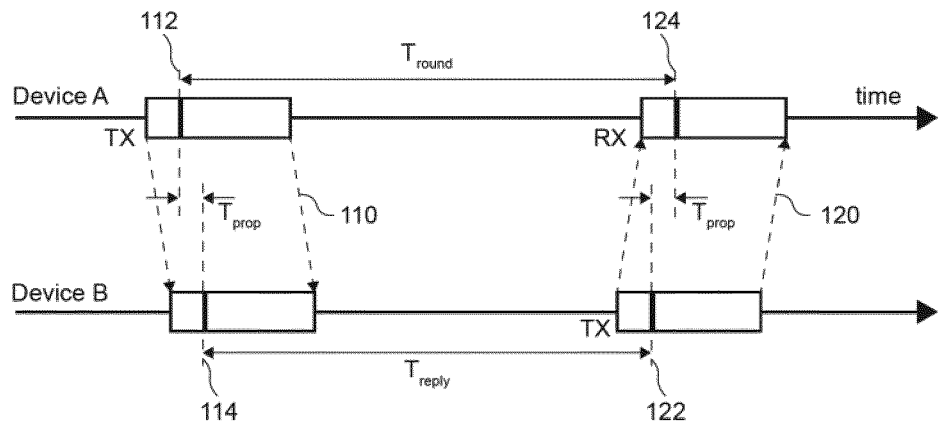
FIG. 1 shows a schematic diagram of transmissions and time intervals in a single-sided two-way ranging approach for determining a propagation time in accordance with the present subject matter.

As pointed out above, one approach for measuring the propagation time is the SS-TWR approach (single-sided two-way ranging). In SS-TWR, the propagation time is determined by $$\hat{T}_{prop} = \frac{1}{2}(T_{round} - T_{reply})$$

based on the measured time intervals $T_{round}$ and $T_{reply}$. $T_{round}$ and $T_{reply}$ are the time intervals between the transmission (TX) and reception (RX) of a wireless packet secured by an STS measured at the vehicle and the hand-held wireless transmitter, respectively. The following figure shows the generic measurement procedure for two devices (Device A and B), one of which generalizes the vehicle and the other the hand-held wireless transmitter. FIG. 1 shows a schematic diagram of transmissions and time intervals in a single-sided two-way ranging approach for determining a propagation time. In FIG. 1, Device A transmits a first wireless transmission 110 to Device B, thereby generating a transmit event 112 at Device A. Device B receives the first wireless transmission 110, thereby generating a receive event 114 at Device B. In response, Device B transmits a second wireless transmission 120 to Device B, thereby generating a transmit event 122 at Device B. Device A receives the second wireless transmission 120, thereby generating a receive event 124 at Device A. The roundtrip time $T_{round}$ denotes the time interval between the transmit event 112 at Device A and the receive event 124 at Device A. The reply time $T_{reply}$ denotes the time interval between the receive event 114 at device B and the transmit event 122 at Device B. The propagation time $T_{prop}$ denotes the time between a transmit event and a receive event of a wireless transmission, e.g., between transmit/receive events 112/114, or between transmit/receive events 122/124. To allow for a calculation of the propagation time according to the formula, the measured time difference of one side may be transmitted to the other side after the SS-TWR measurement procedure. If, for example, the propagation time is to be calculated at Device B according to the formula, $T_{reply}$ may be known at Device B from the measurement, and $T_{round}$ may be transmitted from Device A to Device B. This transmission can be done by a data packet that is transmitted after the SS-TWR transmission exchange, or by any other means. Afterwards, the above formula may be used to calculate the propagation time.

The measurement of the time intervals $T_{round}$ and $T_{reply}$ may be carried out by the devices via a means to measure relative time. Many measuring devices for relative time in commercially available electronic devices use oscillating crystals whose oscillation frequency is specified with a tolerance. The accuracy of the oscillation frequency is subject to production scattering. The accuracy of the propagation time calculation $T_{prop}$ may be negatively influenced by the production dispersion of the oscillating crystals. If the exact frequency of the two oscillating crystals is known, the propagation time measurement can be corrected or mitigated using the following formula, $$\hat{T}_{prop} = \frac{1}{2}(T_{round} - T_{reply}(1 - C_{offs}))$$

wherein $C_{offs}$ represents the quotient of the two oscillation frequencies. In commercial electronic devices and vehicles, this quotient $C_{offs}$ is often not known, because this would require routine, complex measurements under laboratory conditions for the characterization of the temperature and age-dependent change of the oscillating quartz properties. Such calibration procedures are common for high-precision measuring instruments whose purchase price is in the range of >10,000€. Such calibration procedures may be considered unsuitable for consumer terminals such as hand-held wireless transmitters or smartphones due to the high economic costs involved.

Figure 2:
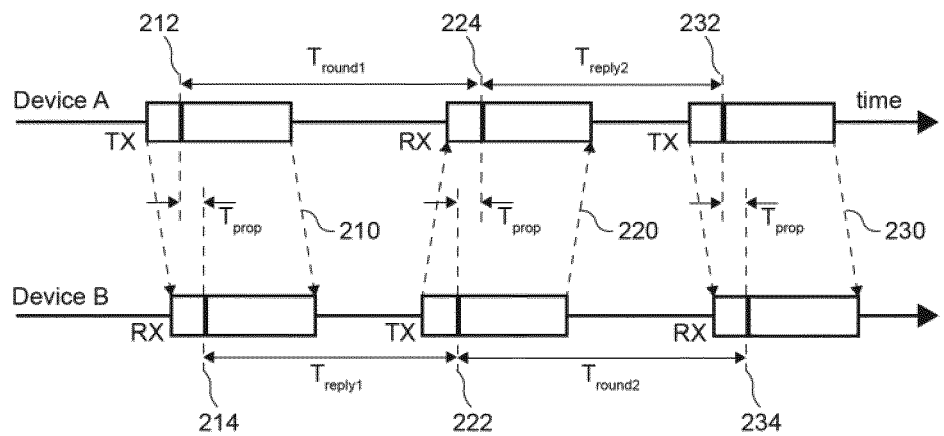
FIG. 2 shows a schematic diagram of transmissions and time intervals in a double-sided two-way ranging approach for determining a propagation time in accordance with the present subject matter.

The DS-TWR method is an alternative, low-cost method for correcting the propagation time measurement based on a measurement of the deviation of the oscillating quartz frequencies between commercially available devices without laboratory characterization. The procedure of the DS-TWR approach is shown in the following figure. FIG. 2 shows a schematic diagram of transmissions and time intervals in a three-message double-sided two-way ranging approach for determining a propagation time. In FIG. 2, Device A transmits a first wireless transmission 210 to Device B, thereby generating a transmit event 212 at Device A. Device B receives the first wireless transmission 210, thereby generating a receive event 214 at Device B. In response, Device B transmits a second wireless transmission 220 to Device B, thereby generating a transmit event 222 at Device B. Device A receives the second wireless transmission 220, thereby generating a receive event 224 at Device A. Device A transmits a third wireless transmission 230 to Device B, thereby generating a further transmit event 232 at Device A. Device B receives the third wireless transmission 230, thereby generating a further receive event 234 at Device B. The first roundtrip time $T_{round1}$ denotes the time interval between the transmit event 212 at Device A and the receive event 224 at Device A. The first reply time $T_{reply1}$ denotes the time interval between the receive event 214 at device B and the transmit event 222 at Device B. The second roundtrip time $T_{round2}$ denotes the time interval between the transmit event 222 at Device B and the receive event 234 at Device B. The second reply time $T_{reply2}$ denotes the time interval between the receive event 224 at device A and the transmit event 232 at Device A. The propagation time $T_{prop}$ denotes the time between a transmit event and a receive event of a wireless transmission, e.g., between transmit/receive events 212/214, between transmit/receive events 222/224, or between transmit/receive events 232/234. In comparison to the SS-TWR, the DS-TWR uses a further wireless message (the third wireless transmission 230), which is transmitted after the transmissions used in SS-TWR. This additional message results in two additional time differences/time intervals, that are denoted $T_{round2}$ and $T_{reply2}$. Using these time intervals, the propagation time may be calculated using $$\hat{T}_{prop} = \frac{(T_{round1} \cdot T_{round2} - T_{reply1} \cdot T_{reply2})}{(T_{round1} + T_{round2} + T_{reply1} + T_{reply2})}$$

The propagation time that is calculated from this formula shows a higher accuracy for the use of inaccurate, cheap oscillating crystals than the calculation by the SS-TWR procedure described before.

Embodiments of the present disclosure provide a cryptographically secure propagation time measurement of wireless signals with simultaneous compensation of oscillating crystal deviations.

Figure 3:
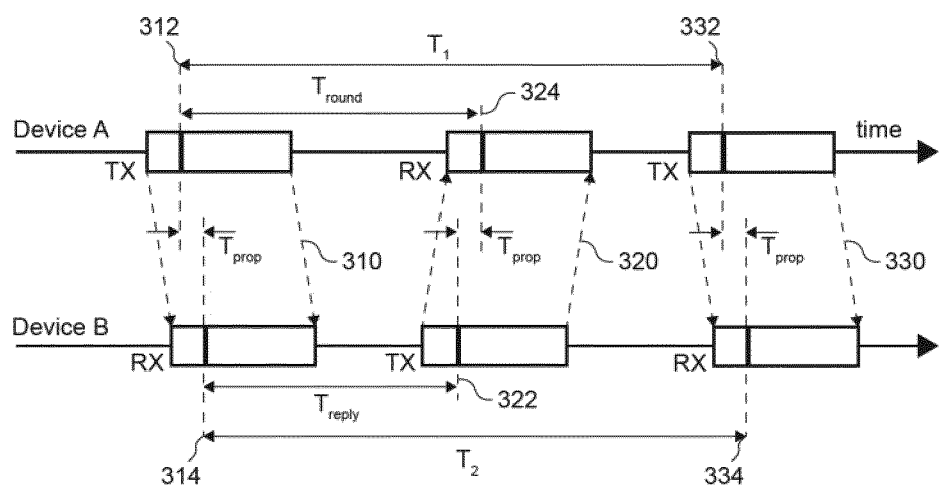
FIG. 3 shows a schematic diagram of transmissions and time intervals in accordance with the present subject matter.

In order to improve the DS-TWR procedure, a compensation method for compensating a tolerance of vibration crystals may be used, that is performed based on a TX-TX and based on an RX-RX time difference. At least some embodiments of the present disclosure may follow the sequence laid out in FIG. 3. FIG. 3 shows a schematic diagram of transmissions and time intervals according to an embodiment. In FIG. 3, Device A transmits a first wireless transmission 310 to Device B, thereby generating a transmit event 312 at Device A. Device B receives the first wireless transmission 310, thereby generating a receive event 314 at Device B. In response, Device B transmits a second wireless transmission 320 to Device B, thereby generating a transmit event 322 at Device B. Device A receives the second wireless transmission 320, thereby generating a receive event 324 at Device A. Additionally, Device A transmits a third wireless transmission 330 to Device B, thereby generating a further transmit event 332 at Device A, and Device B receives the third wireless transmission 330, thereby generating a further receive event 334 at Device B. The roundtrip time $T_{round}$ denotes the time interval between the transmit event 312 at Device A and the receive event 324 at Device A. The reply time $T_{reply}$ denotes the time interval between the receive event 314 at device B and the transmit event 322 at Device B. Contrary to DS-TWR, two additional time intervals $T_1$ and $T_2$ are determined that are not based on RX-TX or TX-RX time measurements, but on RX-RX and TX-TX, respectively. $T_1$ denotes the time interval between the transmit event 312 and the further transmit event 332 at Device A. $T_2$ denotes the time interval between the receive event 314 and the further receive event 334 at Device B. The propagation time $T_{prop}$ denotes the time between a transmit event and a receive event of a wireless transmission, e.g., between transmit/receive events 312/314, between transmit/receive events 322/324, or between transmit/receive events 332/334. Compared to the DS-TWR approach, this procedure achieves a higher accuracy of the propagation time measurement by using TX-TX and RX-RX time differences of the same type. For example, the calculation of the propagation may be carried out as follows:

$$T_{prop} = \frac{1}{2}\left(\frac{T_2}{T_1}T_{round} - T_{reply}\right)$$

Alternatively, the propagation time may be calculated using $$T_{prop} = \frac{(T_{round} \cdot (T_2 - T_{reply}) - T_{reply} \cdot (T_1 - T_{round}))}{(T_1 + T_2)}$$

In some embodiments, the propagation time calculation may be carried out by device B. For example, $T_1$ may be specified in the form of a time constant before the propagation measurement. During the propagation measurement, "Device A" may then send the wireless packets belonging to the two TX events with a time $T_1$ offset according to the time constant. Compared to the DS-TWR method, no transmission of the value $T_1$ by a subsequent data packet may be necessary for the subsequent propagation calculation on Device B. Thus, this variant of the proposed procedure may lead to a lower wireless channel utilization. For capacity-limited wireless channels, this may reduce the susceptibility to errors, energy consumption and/or complexity of the wireless receiver.

Figure 4A:
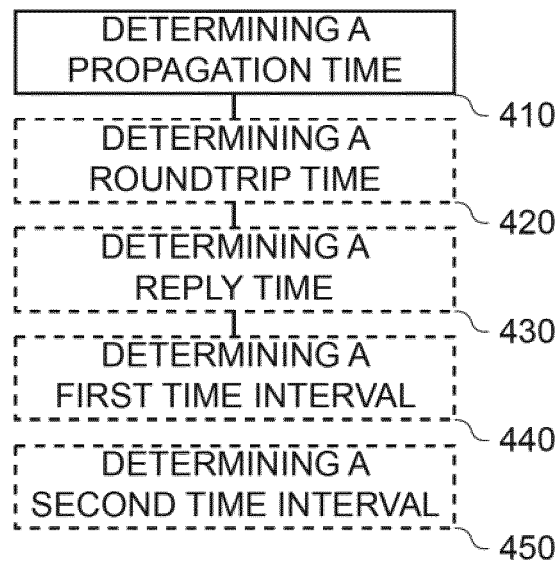
FIG. 4a shows a flow chart of a method for determining a propagation time of wireless transmissions between a first wireless communication device and a second wireless communication device in accordance with the present subject matter.

FIG. 4a shows a flow chart of a method for determining a propagation time of wireless trans-missions between a first wireless communication device and a second wireless communication device. The method comprises determining 410 the propagation time based on a roundtrip time of a wireless transmission exchange between the first wireless communication device and the second wireless communication device, based on a reply time of the wireless transmission exchange, and based on a first time interval and a second time interval. The first time interval is a time interval between a first transmit event at the first wireless communication device and a second transmit event at the first wireless communication device. The second time interval is a time interval between a first receive event at the second wireless communication device and a second receive event at the second wireless communication device.

Figure 4B:
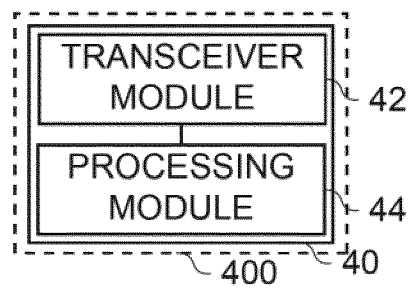
FIG. 4b shows a block diagram of a wireless communication device, configured to execute a method for determining a propagation time of wireless transmissions between a first wireless communication device and a second wireless communication device in accordance with the present subject matter.

FIG. 4b shows a block diagram of a corresponding wireless communication device 40, configured to execute the method for determining the propagation time of wireless transmissions between the first wireless communication device and the second wireless communication device. The wireless communication device 40 of FIG. 4b corresponds to the second wireless communication device introduced above. The wireless communication device 40 comprises a transceiver module 42 for wirelessly communicating with the first wireless communication device. The wireless communication device further comprises a processing module 44, configured to execute the method of FIG. 4a. For example, the processing module 44 is configured to determine 410 the propagation time based on the roundtrip time, based on the reply time, and based on the first time interval and the second time interval. FIG. 4b further shows a device 400 comprising the wireless communication device 40. For example, the device 400 may be a vehicle, i.e. the wireless communication device 40 may be a wireless communication device of/for a vehicle, or the device 400 may be vehicle key fob or a mobile device (such as a smartphone or a wearable device), i.e. the wireless communication device 40 may be a wireless communication device of/for a vehicle key fob or of/for a mobile device.

The following description relates both to the method of FIG. 4a and to the wireless communication device 40 of FIG. 4b.

At least some embodiments relate to a method and wireless communication device for determining the propagation time of wireless transmissions between two wireless communication devices. This propagation time may, subsequently, be used to determine a distance between the two wireless communication devices. In a simple example, the propagation time may be used to determine a distance between the two wireless communication devices, as the propagation time is proportional to the distance. In some more complex embodiments, the propagation time may be used to determine the location of one of the wireless communication device relative to two or more wireless communication devices, e.g., based on a time-difference of arrival (TDOA) scheme. In this case, the propagation time may be determined between one of the wireless communication devices and a plurality of further wireless communication devices, the plurality of further wireless communication device being wireless communication devices having a fixed position in space.

In general, the first wireless communication device, and/or the second wireless communication device, may be wireless communication devices that are used by other devices, e.g., communication chipsets that are used by a mobile device, vehicle key fob or a vehicle to communicate via a wireless communication protocol, such as an Ultra-Wide-Band (UWB) communication protocol, e.g., such as IEEE 802.15.4z (a communication protocol specified by the Institute of Electrical and Electronics Engineers). Accordingly, the first wireless communication device and the second wireless communication device may communicate using Ultra Wide-Band communication. For example, the first and second wireless communication devices may be UWB chipsets, e.g., part of a wireless communication chipset, such as a combined WiFi/UWB chipset. In general, the first and/or second wireless communication device may be used by any device, such as mobile devices, stationary devices, beacons, telecommunication equipment etc. More specifically, embodiments may be used in the automotive field, e.g., for the communication between a vehicle key and a vehicle. Accordingly, one of the first and the second wireless communication device may be a wireless communication device of a vehicle key. The other of the first and the second wireless communication device may be a wireless communication device of a vehicle. Embodiments further provide a vehicle comprising one of the first or second wireless communication device. Embodiments further provide a vehicle key comprising one of the first or second wireless communication device. In some embodiments, the vehicle key may be a (single-purpose) hand transmitter. Alternatively, the vehicle key may be implemented by a mobile device, such as a smartphone or a wearable device.

The method comprises determining 410 the propagation time of wireless transmissions between the first and the second wireless communication devices. In general, the propagation time of a wireless transmission may be defined as time interval between a first point in time, at which the wireless transmission is transmitted by the transmitting wireless communication device (i.e. the "transmit event"), and a second point in time, at which the wireless transmission is (deemed) received by the receiving wireless communication device. In embodiments, these points in time are denoted events. For example, the point in time, at which the wireless transmission is transmitted is a "transmit event", and the point in time, at which the wireless transmission is received is a "receive event".

In general, the wireless transmissions used in embodiments may comprise data that is transmitted using the wireless transmissions. For example, the wireless transmissions may comprise header data and payload data. In general, the wireless transmission, e.g., the header data of the wireless transmission, may e.g., comprise a source identifier and/or a destination identifier of the wireless transmission. In some embodiments, the wireless transmission, e.g., the header data of the wireless transmission, may further comprise a cryptographic secret, which may be used to verify that the wireless transmission actually originated from the wireless communication device that is denoted in the source identifier. For example, the wireless transmission, e.g., the header data of the wireless transmission, may comprise a so-called scrambled timestamp sequence (STS), which is a cryptographically secured bit-sequence which is generated by a deterministic random bit generator based on a seed value (which is known to both the transmitting wireless communication device and the receiving wireless communication device), and which may be used to verify that the wireless transmission actually originates from the first or second wireless communication device.

The time intervals are defined relative to these events. In at least some embodiments, (at least) three wireless transmissions may be exchanged between the first wireless communication device: A first wireless transmission by the first wireless communication device (that generates the first transmit event at the first wireless communication device and the first receive event at the second wireless communication device), a response to the first wireless transmission by the second wireless communication device, and a second wireless transmission by the first wireless communication device (that generates the second transmit event at the first wireless communication device and the second receive event at the second wireless communication device).

For example, the roundtrip time may be a time interval between a transmit event at the first wireless communication device and a (directly) subsequent receive event at the first wireless communication device. The roundtrip time may be the time interval between the transmit event (i.e. the first transmit event) related to the transmission of the first wireless transmission by the first wireless communication device, and a receive event related to the reception of the response by the first wireless communication device. The method may comprise determining 420 the roundtrip time, e.g., by measuring the roundtrip time (by the first wireless communication device), or by receiving information on the roundtrip time from the first wireless communication device.

The reply time may be a time interval between a receive event at the second wireless communication device and a subsequent transmit event at the second wireless communication device. In this case, the reply time may be the time interval between the receive event (i.e. the first receive event) related to the reception of the first wireless transmission by the second wireless communication device and the transmit event related to the transmission of the response by the second wireless communication device. The method may comprise determining 430 the reply time, e.g., by measuring the reply time (by the second wireless communication device), or by receiving information on the reply time from the second wireless communication device.

Both the roundtrip time ($T_{round}$) and the reply time ($T_{reply}$) are shown in the schematic diagrams of FIGS. 1 to 3. If the method is executed by the first wireless communication device, the method may comprise receiving information on the reply time from the second wireless communication device, e.g., as part of the response to the first wireless transmission. If the method is executed by the second wireless communication device, the method may comprise receiving information on the roundtrip time from the first wireless communication device, e.g., as part of the second wireless transmission, or in addition to the second wireless transmission.

Apart from the roundtrip time and the reply time, the first and the second time interval are used to determine the propagation time. For example, the first time interval and the second time interval are used to mitigate an influence of a difference in time measurement between the first wireless communication device and the second wireless communication device. In this context, the term "mitigate" may indicate, that the influence is reduced. A complete mitigation (to reduce the influence to zero) may be covered by the term "mitigate", but is not necessary to provide mitigation.

The first time interval is a time interval between the first transmit event at the first wireless communication device and the second transmit event at the first wireless communication device. In at least some embodiments, the first transmit event and the first receive event are generated by the transmission and reception of the first wireless transmission. The second transmit event and the second receive event may be generated by the transmission and reception of the second wireless transmission. In some embodiments, the first time interval is a pre-defined time interval, i.e. the first time interval may be a fixed time interval. In this case, the second transmit event may be triggered by the first time interval, i.e. when the first time interval. For example, the second transmit event may be scheduled based on the first time interval. In this case, information on the first time interval might not be transmitted from the first to the second wireless communication device, as it may be known at the second wireless communication device. Alternatively, the first time interval might not have a pre-defined length. In this case, two options are conceivable. In some embodiments, the first time interval may be measured by the first wireless communication device, e.g., by starting the measurement at the first transmit event and stopping the measurement at the second transmit event. Accordingly, if the method is executed by the first wireless communication device, the method may comprise measuring the first time interval. In this case, information related to the first time interval may be transmitted from the first wireless communication device to the second wireless communication device after the second wireless transmission (i.e. in addition to the second wireless transmission). Alternatively, the second transmit event may be scheduled, e.g., after the first wireless communication device has received a response to the wireless transmission related to the first transmit event. In this case, the information related to the first time interval may be transmitted from the first wireless communication device to the second wireless communication device with the second wireless transmission. Accordingly, if the method is executed by the second wireless communication device, the method may comprise receiving information on the first time interval from the first wireless communication device, e.g., as part of the second wireless transmission, or in addition to the second wireless transmission. In conclusion, the method may comprise determining 440 the first time interval, e.g., by measuring or determining the first time interval based on the first and second transmit event (by the first wireless communication device), by using a pre-defined time interval, or by receiving information on the first time interval from the first wireless communication device.

The second time interval is a time interval between the first receive event at the second wireless communication device and the second receive event at the second wireless communication device. In embodiments, the second time interval may be measured by the second wireless communication device, e.g., by starting the measurement at the first receive event and stopping the measurement at the second receive event. Accordingly, if the method is executed by the second wireless communication device, the method may comprise determining or measuring the second time interval. If the method is executed by the first wireless communication device, the method may comprise receiving information on the second time interval from the second wireless communication device, e.g., as part of a wireless transmission. In conclusion, the method may comprise determining 450 the second time interval, e.g., by measuring the second time interval based on the first and second receive event (by the second wireless communication device), by using a pre-defined time interval, or by receiving information on the second time interval from the second wireless communication device.

In the following, two approaches are shown, which may be used to mitigate the influence of the tolerances of the quartz crystals. In a first approach, the propagation time may be determined based on a ratio between the second time interval and the first time interval. The ratio may be used akin to the correction factor ($1-C_{offs}$) introduced above. For example, the propagation time may be determined using the formula $$T_{prop} = \frac{1}{2}\left(\frac{T_2}{T_1}T_{round} - T_{reply}\right)$$

wherein $T_{prop}$ is the propagation time, $T_1$ is the first time interval, $T_2$ is the second time interval, $T_{round}$ is the roundtrip time and $T_{reply}$ is the reply time. In this case, the ratio between the second time interval and the first time interval, $$\frac{T_2}{T_1},$$

may reproduce the offset in time measurement between the two wireless communication devices, as the two receive events should (theoretically) be a fixed time interval (i.e. the propagation time) away from the two transmit events, assuming that the distance and transmission conditions don't significantly change between the two wireless transmissions.

In another approach, the formula used in DS-TWR with three messages may be adapted, so that now, instead of using four RX-TX/TX-RX time intervals, two RX-TX/TX-RX, one RX-RX and one TX-TX time interval is used. For example, the propagation time may be determined using the formula $$T_{prop} = \frac{(T_{round} \cdot (T_2 - T_{reply}) - T_{reply} \cdot (T_1 - T_{round}))}{(T_1 + T_2)}$$

wherein $T_{prop}$ is the propagation time, $T_1$ is the first time interval, $T_2$ is the second time interval, $T_{round}$ is the roundtrip time and $T_{reply}$ is the reply time. This may further reduce the inaccuracies, by having fewer components that depend on a RX-TX or TX-RX measurement.

In some embodiments, the propagation time may be determined repeatedly, e.g., to decrease the influence of noise or artifacts, or in order to track the distance or position of one of the wireless communication devices. In this case, at least the second time interval may be measured repeatedly, and an average of the measured second time intervals may be used as second time interval. In other words, for each determination of the propagation time, the second time interval may be measured anew. The second time interval may be averaged over at least two measurements.

In general, the method may be performed by any of the two wireless communication devices, or even by a third device. For example, the method may be executed by the first wireless communication device. In this case, information on the reply time and information on the second time interval may be transmitted by the second wireless communication device and received by the first time interval, i.e. the method may comprise receiving the information on the reply time and the information on the second time interval from the second wireless communication device. In some embodiments, however, the method may be performed by the second wireless communication device. In this case, the method may comprise receiving information on the roundtrip time and, optionally, information on the first time interval from the first wireless communication device. Three wireless transmissions may suffice to perform the method at the second wireless communication device, e.g., if the information on the roundtrip time, and optionally the information on the first time interval, is transmitted as part of the second wireless transmission.

Figure 5:
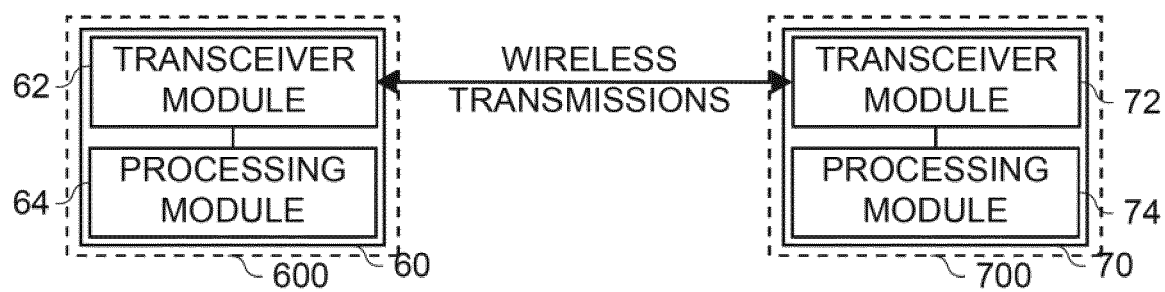
FIG. 5 shows a block diagram of a first and of a second wireless communication device in accordance with the present subject matter.

FIG. 5 shows a block diagram of the first wireless communication device 60 and of the second wireless communication device 70. The first wireless communication device 60 comprises a transceiver module 62 for wirelessly communicating with the second wireless communication device, and a processing module 64 that is coupled to the transceiver module 62. The second wireless communication device 70 comprises a transceiver module 72 for wirelessly communicating with the first wireless communication device, and a processing module 74 that is coupled to the transceiver module 72. FIG. 5 further shows a system comprising the first and the second wireless communication device.

Figure 6A:
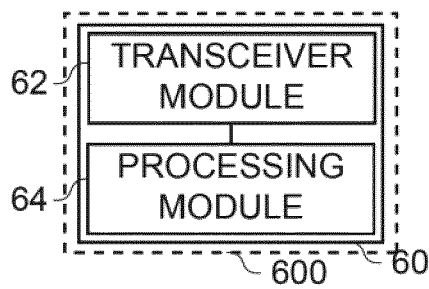
FIG. 6a shows a block diagram of an embodiment of a first wireless communication device in accordance with the present subject matter.
Figure 6B:
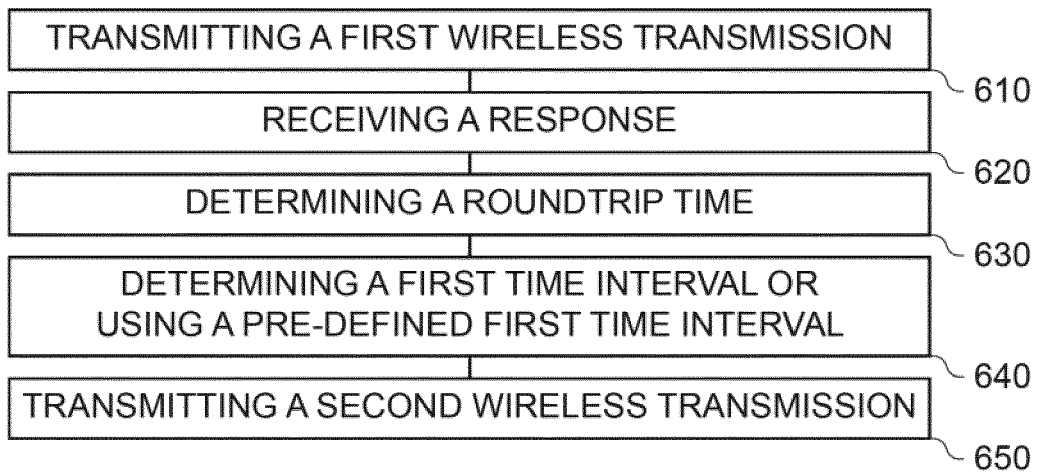
FIGS. 6b and 6c show flow charts of embodiments of a method for a first wireless communication device in accordance with the present subject matter.
Figure 6C:
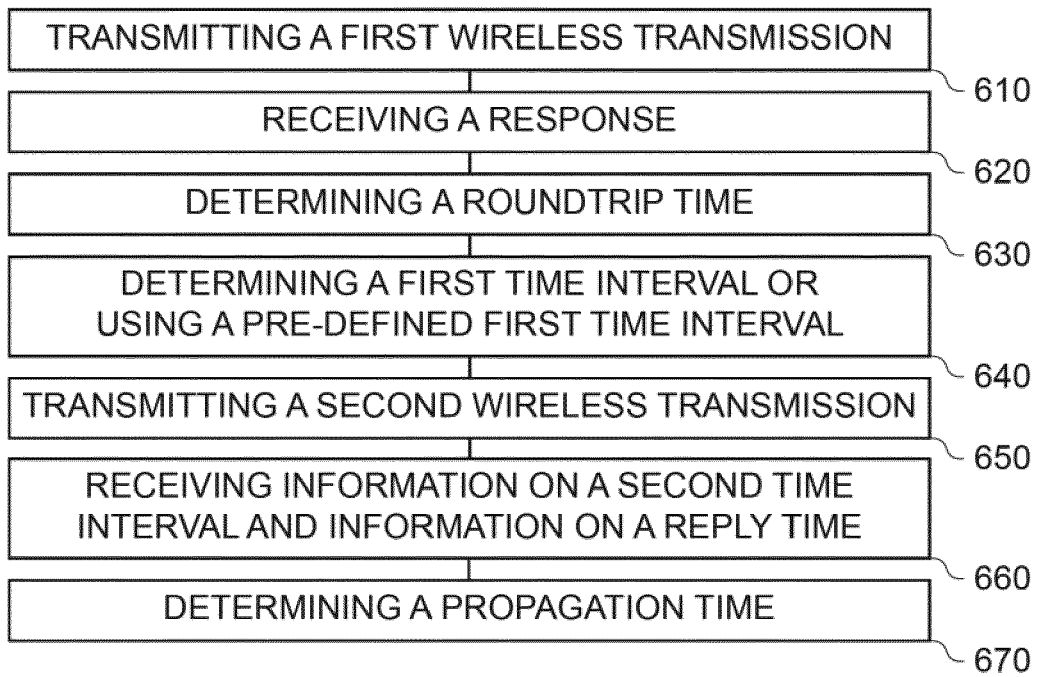

FIG. 6a shows a schematic block diagram of the first wireless communication device. FIG. 6b shows a flow chart of an embodiment of a method for the first wireless communication device, in case the propagation time is determined by the second wireless communication device, and FIG. 6c shows a flow chart of an embodiment of the method, in case the propagation time is determined by the first wireless communication device. FIG. 6a further shows a device 600 comprising the first wireless communication device 60. For example, the device 600 may be one of a mobile device, a vehicle key (fob) and a vehicle.

In both cases, the processing module 64 of the first wireless communication device 60 is configured to transmit the first wireless transmission to the second wireless communication device via the transceiver module, thereby generating the first transmit event. The processing module 64 is configured to receive the response to the first wireless transmission from the second wireless communication device via the transceiver module 62. The processing module 64 is configured to determine the roundtrip time. The roundtrip time denotes the time interval between the transmission of the first wireless transmission and the reception of the response to the first wireless transmission. The processing module 64 is configured to transmit the second wireless transmission to the second wireless communication device, thereby generating the second transmit event. The processing module 64 may be configured to either use the pre-defined first time interval, or to determine the first time interval based on the first and second transmit event. For example, the processing module 64 may be configured to determine the first time interval based on the first and the second transmit event, e.g., by measuring the first time interval, or by scheduling the second transmit event and using the scheduled time of the second transmit event to determine the first time interval. Alternatively, the first time interval may be the pre-defined time interval triggering the transmission of the second wireless transmission.

Accordingly, the method of FIGS. 6b and 6c may comprise transmitting 610 the first wireless transmission to the second wireless communication device, thereby generating the first transmit event. The method may comprise receiving 620 the response to the first wireless transmission from the second wireless communication device. The method may comprise determining 630 a roundtrip time, the roundtrip time denoting a time interval between the transmission of the first wireless transmission and the reception of the response to the first wireless transmission. The method may comprise may comprise transmitting 650 the second wireless transmission to the second wireless communication device, thereby generating the second transmit event. In some embodiments, as shown at 640, the method may comprise using a pre-defined first time interval, in some embodiments, the method may comprise determining the first time interval based on the first and second transmit event.

If the determination of the propagation time is performed by the second wireless communication device, the processing module 64 may be configured to transmit information on the roundtrip time and, optionally, information on the first time interval (it the first time interval is not pre-defined) to the second wireless communication device. Accordingly, the method may, as shown in of FIG. 6b, comprise transmitting information on the roundtrip time and, optionally, information on the first time interval. For example, the information on the roundtrip time may be transmitted as part of the second wireless transmission, or as part of an additional wireless transmission. In some embodiments, the first time interval may be pre-defined, so no information might be transmitted from the first to the second wireless communication device. Alternatively, information to the first time interval may be transmitted as part of the second wireless transmission, or as part of an additional wireless transmission, e.g., with the information on the roundtrip time.

If the determination of the propagation time is performed by the first wireless communication device, the processing module 64 may be configured to receive information on the reply time and information on the second time interval from the second wireless communication device. Accordingly, the method may, as shown in FIG. 6c, comprise receiving 660 the information on the reply time and the information on the second time interval from the second wireless communication device. For example, the information on the reply time may be received within the response, or within an additional wireless transmission from the second wireless communication device. The information on the second time interval may be received within an additional wireless transmission from the second wireless communication device, e.g., with the information on the reply time. Furthermore, the processing module 64 may be configured to determine the propagation time based on the roundtrip time, the reply time, the first time interval and the second time interval. The method may, as shown in FIG. 6c, comprise determining the propagation time based on the roundtrip time, the reply time, the first time interval and the second time interval. The propagation time may be determined using at least one of the approaches shown in connection with FIGS. 3 to 4b.

Figure 7A:
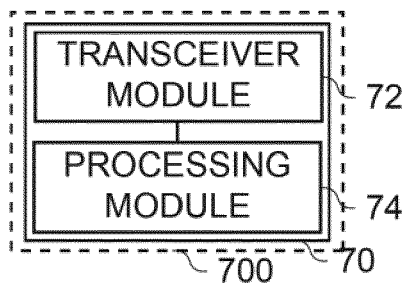
FIG. 7a shows a block diagram of an embodiment of a second wireless communication device in accordance with the present subject matter.
Figure 7B:
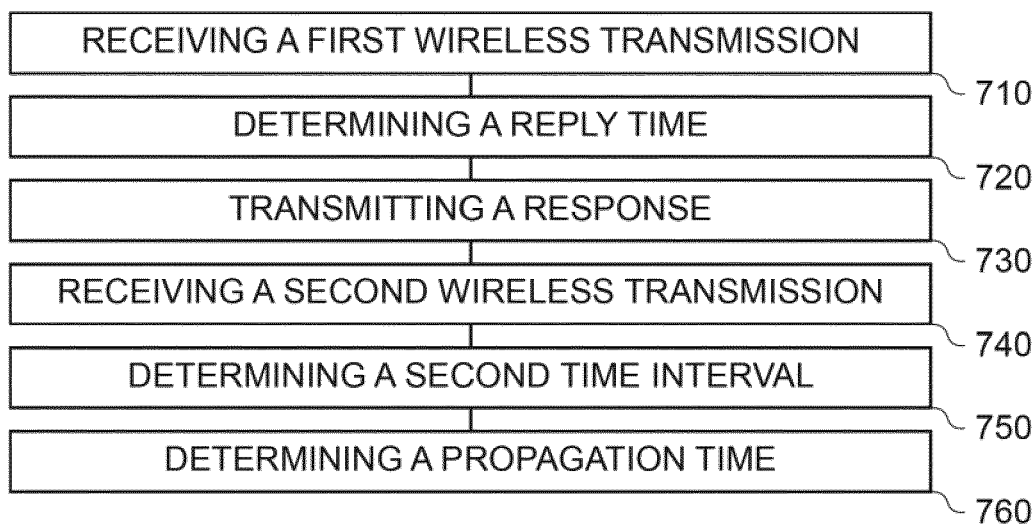
FIGS. 7b and 7c show flow charts of embodiments of a method for a second wireless communication device in accordance with the present subject matter.
Figure 7C:
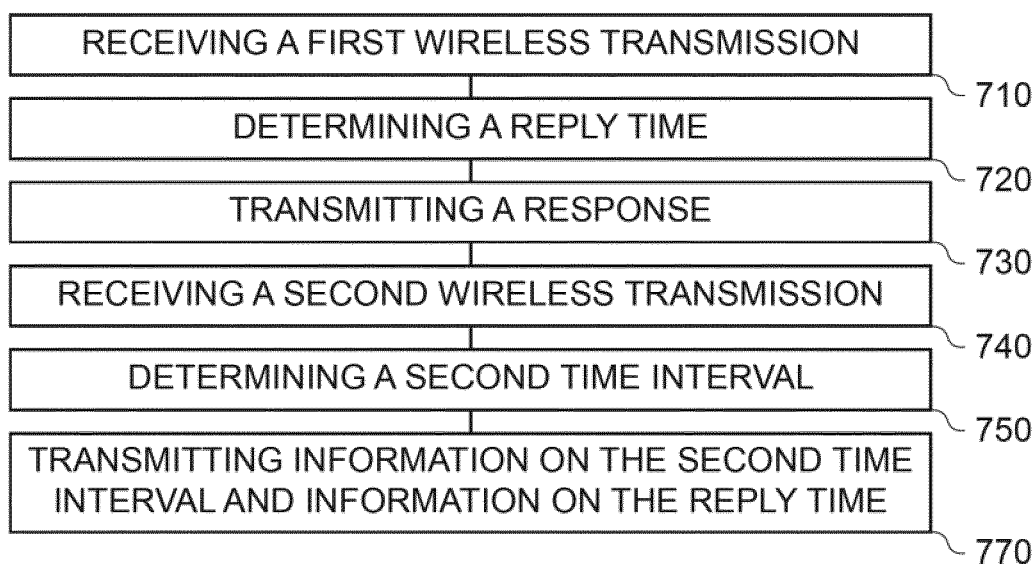

FIG. 7a shows a schematic block diagram of the second wireless communication device. FIG. 7b shows a flow chart of an embodiment of a method for the second wireless communication device, in case the propagation time is determined by the second wireless communication device, and FIG. 7c shows a flow chart of a further embodiment of the method, in case the propagation time is determined by the second wireless communication device. FIG. 7a further shows a device 700 comprising the second wireless communication device 70. For example, the device 700 may be one of a mobile device, a vehicle key (fob) and a vehicle.

In both cases, the processing module 74 is configured to receive the first wireless transmission from the first wireless communication device via the transceiver module, thereby generating the first receive event. The processing module 74 is configured to transmit the response to the first wireless transmission to the first wireless communication device via the transceiver module. The processing module 74 is configured to determine the reply time. The reply time denotes the time interval between the reception of the first wireless transmission and the transmission of the response to the first wireless transmission. The processing module 74 is configured to receive the second wireless transmission from the first wireless communication device via the transceiver module, thereby generating the second receive event. The processing module 74 is configured to determine the second time interval between the first receive event and the second receive event. The first time interval denotes a time interval between the first transmit event at the first wireless communication device and the second transmit event at the first wireless communication device. The first transmit event is generated by the transmission of the first wireless transmission by the first wireless communication device. The second transmit event is generated by the transmission of the second wireless transmission by the first wireless communication device.

Accordingly, the method of FIGS. 7b and 7c comprises receiving 710 the first wireless transmission from the first wireless communication device via the transceiver module, thereby generating the first receive event. The method comprises determining 720 the reply time. The method comprises transmitting 730 the response to the first wireless transmission to the first wireless communication device via the transceiver module. The method comprises receiving 740 the second wireless transmission from the first wireless communication device via the transceiver module, thereby generating the second receive event. The method comprises determining 750 the second time interval between the first receive event and the second receive event.

If the determination of the propagation time is performed by the second wireless communication device, the processing module 74 may be configured to receive information on the roundtrip time, and optionally information on the first time interval, from the first wireless communication device. Accordingly, the method may comprise receiving information on the roundtrip time, and optionally the information on the first time interval, from the first wireless communication device. For example, the information on the roundtrip time, and optionally the information on the first time interval, may be received as part of the second wireless transmission, or as part of an additional wireless transmission. The processing module 74 may be configured to determine the propagation time based on the roundtrip time, the reply time, the first time interval and the second time interval. Accordingly, the method may, as shown in FIG. 7b, comprise determining 760 the propagation time based on the roundtrip time, the reply time, the first time interval and the second time interval.

If the determination of the propagation time is performed by the first wireless communication device, the processing module 74 may be configured to transmit information on the reply time and information on the second time interval to the first wireless communication device. Accordingly, the method may, as shown in FIG. 7c, comprise transmitting 770 the information on the reply time and the information on the second time interval to the first wireless communication device. For example, the information on the reply time may be transmitted as part of the response, or within an additional wireless transmission from the second wireless communication device to the first wireless communication device. The information on the second time interval may be transmitted as part of an additional wireless transmission from the second wireless communication device, e.g., with the information on the reply time.

Embodiments further provide a computer program having a program code for performing the method of at least one of FIG. 6b, 6c, 7b or 7c, when the computer program is executed on a computer, a processor, or a programmable hardware component.

In embodiments the processing modules 64; 74 may be implemented using one or more processing units, one or more processing devices, any means for processing, such as a processor, a computer or a programmable hardware component being operable with accordingly adapted software. In other words, the described function of the processing modules 64; 74 may as well be implemented in software, which is then executed on one or more programmable hardware components. Such hardware components may comprise a general-purpose processor, a Digital Signal Processor (DSP), a micro-controller, etc.

The transceiver modules 62; 72 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the transceiver module 62; 72 may be configured to communicate via Ultra-Wide Band communication.

More details and aspects of the wireless communication devices and methods of FIGS. 5 to 7c are mentioned in connection with the proposed concept or one or more examples described above or below (e.g., FIGS. 1 to 4b). The wireless communication devices and methods of FIGS. 5 to 7c may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a similar feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or electronic control units programmed to perform the acts of the above-described methods or (field) programmable logic arrays ((F)PLAs) or (field) programmable gate arrays ((F)PGAs), programmed to perform the acts of the above-described methods.

What is claimed is:

1. A method for determining a propagation time of wireless transmissions between a first wireless communication device and a second wireless communication device, the method comprising:
    determining the propagation time based on:
        a roundtrip time of a wireless transmission exchange between the first wireless communication device and the second wireless communication device,
        a reply time of the wireless transmission exchange, and
        a first time interval and a second time interval, wherein
            the first time interval exists between a first transmit event at the first wireless communication device and a second transmit event at the first wireless communication device, and
            the second time interval exists between a first receive event at the second wireless communication device and a second receive event at the second wireless communication device,
    wherein the propagation time is determined based on a ratio between the second time interval and the first time interval, and
    wherein the propagation time is determined using the formula:

$$T_{prop} = \frac{1}{2}\left(\frac{T_2}{T_1}T_{round} - T_{reply}\right)$$

wherein
    $T_{prop}$ is the propagation time,
    $T_1$ is the first time interval,
    $T_2$ is the second time interval,
    $T_{round}$ is the roundtrip time, and
    $T_{reply}$ is the reply time.

2. The method according to claim 1, wherein the first time interval and the second time interval are used to mitigate an influence of a difference in time measurement between the first wireless communication device and the second wireless communication device.

3. The method according to claim 1, wherein the method is performed by the second wireless communication device.

4. The method according to claim 1, wherein the first time interval is a pre-defined time interval, or the first time interval is received by the second wireless communication device from the first wireless communication device.

5. The method according to claim 1, wherein one of the first and the second wireless communication device is a wireless communication device of a vehicle key, and the other of the first and the second wireless communication device is a wireless communication device of a vehicle.

6. The method according to claim 1, wherein the first wireless communication device and the second wireless communication device communicate using Ultra Wide-Band communication.

7. The method according to claim 1, wherein the roundtrip time exists between a transmit event at the first wireless communication device and a subsequent receive event at the first wireless communication device, and/or the reply time exists between a receive event at the second wireless communication device and a subsequent transmit event at the second wireless communication device.

8. A method for determining a propagation time of wireless transmissions between a first wireless communication device and a second wireless communication device, the method comprising:
determining the propagation time based on:
a roundtrip time of a wireless transmission exchange between the first wireless communication device and the second wireless communication device,
a reply time of the wireless transmission exchange, and
a first time interval and a second time interval, wherein
the first time interval exists between a first transmit event at the first wireless communication device and a second transmit event at the first wireless communication device, and
the second time interval exists between a first receive event at the second wireless communication device and a second receive event at the second wireless communication device, wherein
the propagation time is determined using the formula $$T_{prop} = \frac{(T_{round} \cdot (T_2 - T_{reply}) - T_{reply} \cdot (T_1 - T_{round}))}{(T_1 + T_2)}$$

wherein
$T_{prop}$ is the propagation time,
$T_1$ is the first time interval,
$T_2$ is the second time interval,
$T_{round}$ is the roundtrip time, and
$T_{reply}$ is the reply time.

9. A method for determining a propagation time of wireless transmissions between a first wireless communication device and a second wireless communication device, the method comprising:
determining the propagation time based on:
a roundtrip time of a wireless transmission exchange between the first wireless communication device and the second wireless communication device,
a reply time of the wireless transmission exchange, and
a first time interval and a second time interval, wherein
the first time interval exists between a first transmit event at the first wireless communication device and a second transmit event at the first wireless communication device, and
the second time interval exists between a first receive event at the second wireless communication device and a second receive event at the second wireless communication device, wherein
the propagation time is determined repeatedly,
for each determination of the propagation time, the second time interval is measured anew, and
the second time interval is averaged over at least two measurements.

10. A non-transitory computer-readable medium comprising instructions operable, when executed by one or more computing systems, to perform the method of claim 1.

11. A wireless communication device comprising:
a transceiver module for wirelessly communicating with a first wireless communication device; and
a processor configured to execute the method according to claim 1.

* * * * *